United States Patent [19]

Scheidecker et al.

[11] Patent Number: 4,892,672
[45] Date of Patent: Jan. 9, 1990

[54] PROCESS FOR CONTROLLING FERROUS IRON CONTENT IN MANGANESE ZINC FERRITE

[75] Inventors: Ralph W. Scheidecker; Robert R. Suchomel, both of Byron, Minn.

[73] Assignee: International Business Machines Corporation, Armonk, N.Y.

[21] Appl. No.: 761,534

[22] Filed: Aug. 1, 1985

Related U.S. Application Data

[63] Continuation-in-part of Ser. No. 566,872, Dec. 29, 1983, abandoned.

[51] Int. Cl.⁴ .............................................. C04B 35/26
[52] U.S. Cl. .............................. 252/62.51; 252/62.56; 423/594; 423/DIG. 15
[58] Field of Search ....................... 423/594, DIG. 15; 252/62.51, 62.56

[56] References Cited

U.S. PATENT DOCUMENTS

| | | | |
|---|---|---|---|
| 2,886,529 | 5/1959 | Guillaud | 252/62.56 |
| 3,015,538 | 1/1962 | Weber et al. | 252/62.56 |
| 3,424,685 | 1/1969 | Pierrot et al. | 252/62.56 |
| 3,948,785 | 4/1976 | Berchtold | 423/594 |
| 4,097,392 | 6/1978 | Goldman et al. | 252/62.56 |
| 4,247,500 | 1/1981 | Dixon et al. | 252/62.56 |
| 4,440,713 | 4/1984 | Rigby | 423/594 |

FOREIGN PATENT DOCUMENTS 210820 10/1956 Australia .......................... 252/62.56
2158804 11/1971 Fed. Rep. of Germany ...... 423/594

Primary Examiner—John Doll
Assistant Examiner—Robert M. Kunemund
Attorney, Agent, or Firm—Hugh D. Jaeger

[57] ABSTRACT

Process of calcining the ball milling manganese zinc MnZn, ferrite material for achieving a ferrite having a ferrous iron content appropriate for optimum magnetic properties. A first initial ball milling step is very carefully controlled as a small amount of metallic iron is blended into an initial mixture which is a catalyst for the ferrous iron reduction reaction during a calcine step. This provides for a predetermined ferrous iron content to be set in the powder prior to any forming or firing steps. The process includes a controlled atmosphere, time, and temperature for the calcining process step, and a second controlled ball milling step over time where the interaction of the stainless steel balls and milled slurry contributes to final ferrous iron content. These two process steps are balanced yielding a MnZn ferrite powder of a predetermined particle size with a controlled ferrous iron content which is a function of both the calcining and ball milling steps.

10 Claims, 3 Drawing Sheets

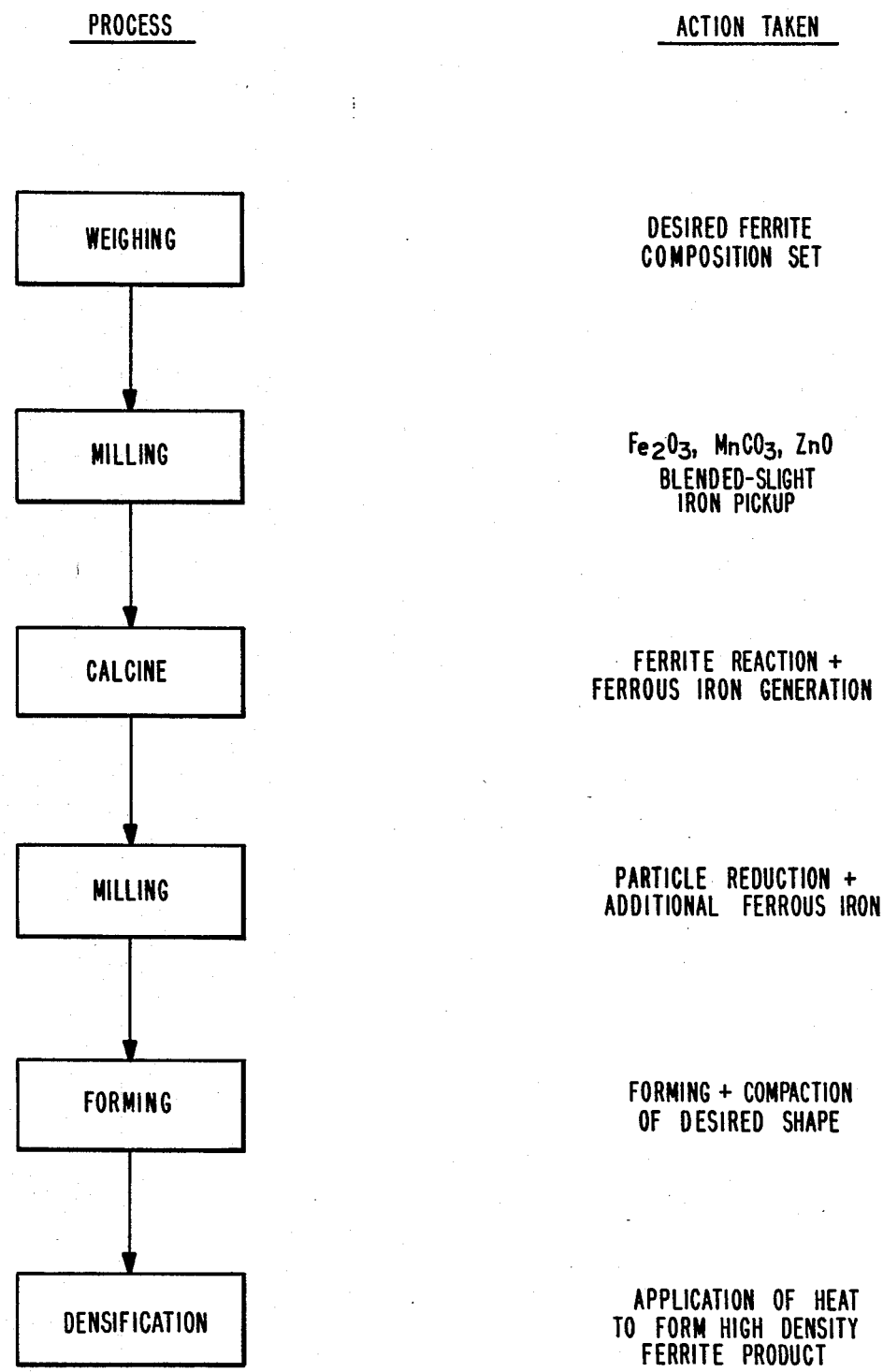

PROCESS FOR CONTROLLING FERROUS IRON CONTENT IN MANGANESE ZINC FERRITE

CROSS REFERENCES TO RELATED APPLICATIONS

This application is a continuation-in-part of U.S. Ser. No. 566,872, filed Dec. 29, 1983.

TECHNICAL FIELD

This invention relates to development of proper ferrous iron concentration in manganese zinc, MnZn, ferrite prior to the densification step by methods such as hot pressing or sintering; and more particularly, provides steps of calcining and milling which are balanced to provide proper final ferrous iron content in a fixed ferrite composition. The invention recognizes the importance of the control of the first milling step where metallic iron which is picked up during milling and acts as a catalyst for the ferrous iron reduction reaction during the calcining operation.

BACKGROUND ART

Prior art patents related to the production of MnZn ferrite have not approached the development of proper ferrous iron content during the calcining and milling steps. The prior art has failed to recognize that ferrous iron content can be controlled during the calcining operation and especially during the length of the milling operation.

While the prior art teaches calcining, the prior art does not appear to recognize that the calcining ought to be done in an inert atmosphere such as nitrogen, as recognized in this disclosure.

DISCLOSURE OF THE INVENTION

The present invention is for a process of calcining and ball milling MnZn ferrite material having compositions in the ranges of about 52–55 mole percent $Fe_2O_3$, about 26–32 mole percent MnO, and about 15–20 mole percent ZnO for achieving a ferrite having a ferrous iron content of about 1.5 percent, thereby providing optimum magnetic properties. This ferrous iron content is achieved by controlling the atmosphere, the time and the temperature of the calcining process, as well as controlling the ball milling steps which further contributes to the ferrous iron content by interaction of the stainless steel balls and the ferrite slurry being milled. These two steps are balanced, so that both calcining and ball milling contribute to the final ferrous iron content where the ball milling is the primary contributor to the final particle size. The initial first ball milling step needs to be very carefully controlled as metallic iron, which is picked up, acts as a catalyst for the ferric iron to ferrous iron reduction during the calcining operation.

According to one embodiment of the present invention, there is provided a process for preparing MnZn ferrite with a predetermined ferrous iron content prior to hot pressing or sintering comprising the steps of initial ball milling in a stainless steel mill and media and then calcining a mixture of $Fe_2O_3$, $MnCO_3$, and ZnO in a flowing nitrogen atmosphere at a temperature in the range of 900 degrees to 1100 degrees centigrade for one to ten hours. Then the mixture is cooled to 150 degrees centigrade or less in an atmosphere of flowing nitrogen. Following calcination, it may be necessary to pulverize the calcined product to about 0.1 of the diameter of the milling media to achieve uniform milling. Finally, the pulverized ferrite material is wet ball milled using stainless steel ball media for a period of time to achieve a predetermined particle size and ferrous iron content including additional pick-up and generation of ferrous iron.

One significant aspect and feature of the present invention is that the process used in the present invention is a key step in the production of ferrite, and particularly MnZn ferrite for magnetic transducer heads. An optimum MnZn ferrite product can be achieved by proper control of the chemistry of the material prior to the final densification step, and the yield of optimum MnZn ferrite is superior to the prior art. The yield of useable MnZn ferrite product approaches one hundred percent.

Another significant aspect and feature of the present invention is an optimum ferrite product for subsequent processing and an optimum ferrite product having qualities which are subsequently maintained through processing steps.

BRIEF DESCRIPTION OF THE DRAWINGS

FIG. 3 illustrates a flow chart of the steps in the process.

DESCRIPTION OF THE INVENTION

Production of MnZn ferrite is done under consideration of the ferrous iron content in the final ferrite material in order to assure the desired magnetic properties. The ferrous iron content is dependent on the MnZn ferrite composition being utilized. The ferrous iron is developed through proper control of atmosphere, time, temperature, and mechanical milling work following heat treatment, and is accomplished in the following steps of the process, as also illustrated in FIG. 3.

Starting with powders of iron oxide, $Fe_2O_3$, zinc oxide, ZnO, and manganese carbonate, $MnCO_3$, the powders are weighed out in proper proportions to achieve the desired ferrite composition, with adjustments being made for volatile losses and iron pick-up during milling operations. The ingredients are wet or dry milled together to obtain intimate mixing of these powders. The composition can be either wet ball or dry ball milled with stainless steel balls in a stainless steel container. During the first ball milling step of stainless steel mill and media, a very small amount of metallic iron is blended into this powder mixture. Since this metallic iron is a catalyst for the ferric iron to ferrous iron reduction reaction during the calcine operation, the first milling step needs to be very carefully controlled. This also provides for accurate reproducibility of the invention. The milling media cannot be exposed to air so as to prevent oxidation to the milling media in between milling steps. These milled ingredients are dried, pulverized into a fine powder and then placed into a furnace at a temperature in the range of 900 degrees to 1100 degrees centigrade for one to ten hours under a flowing inert gas. The temperature and time profile for this calcine reaction is set depending upon the metallic iron pick-up of the previous ball milling step. The larger the pick-up during this milling step, the lower the calcine reaction temperature. This step eliminates volatiles and the carbonate, allows the oxides to automatically rearrange and form the ferrite spinel structure, and allows for the reduction of the desired amount of iron. This reduction reaction is expressed as:

$$3Fe_2O_3 = 2Fe_3O_4 + \tfrac{1}{2}O_2$$

where $Fe_3O_4$ magneite is a combination of FeO, ferrous iron and $Fe_2O_3$ ferrite iron, ($Fe_3O_4 = FeO\ Fe_2O_3$)

Figure 1:
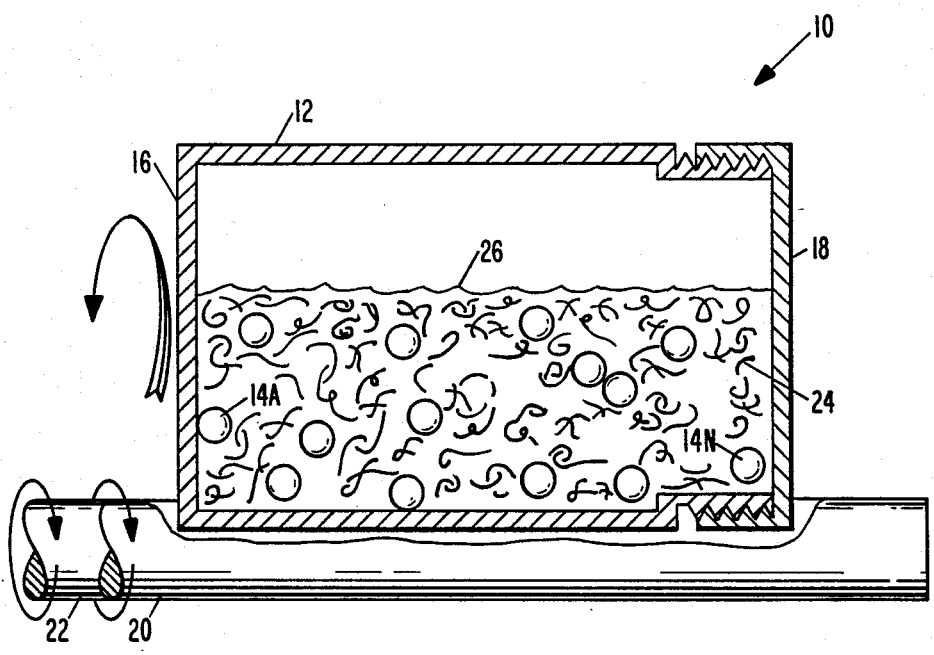
FIG. 1 illustrates apparatus for precalcine and post calcine wet ball milling.

FIG. 1 illustrates apparatus 10 for precalcine ball milling or post calcine ball milling including a stainless steel ball mill 12 and stainless steel balls 14a–14n therein. The mill 12 is essentially a closed cylinder 16 with a locking cover 18. The mill 12 supported on a plurality of opposing rotatively driven roller 20 and 22 which transfer like motion to the mill 12 as illustrated by the arrows. The closed mill 12 includes the powdered ferrite material 24 in a water solution 26 providing a milled slurry. The magnetic properties are set on the powder stage. The precalcining ball milling is key to the invention as the initial amount of iron is catalyst to the calcine reaction providing for consistently reproducible results. By analyzing through chemistry, the chrome content determines the iron pick-up from the media.

Figure 2:
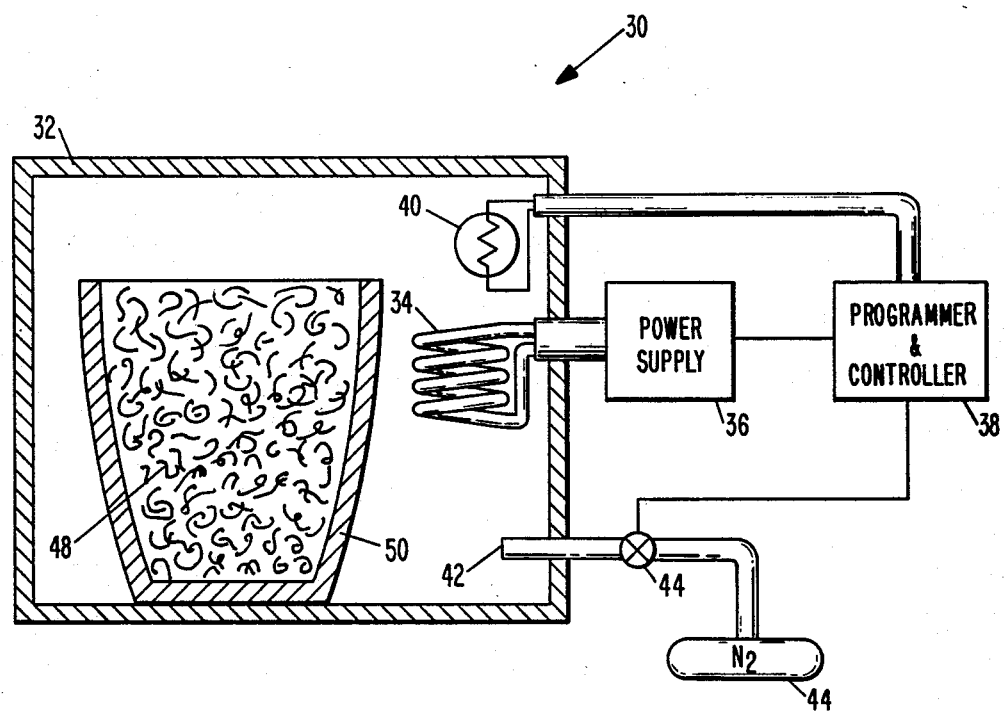
FIG. 2 illustrates apparatus for calcining.

FIG. 2 illustrates calcining apparatus 30 including a closed environmental oven 32. An electric heater 34 connected to a power supply 36 controlled by a programmed controller 38. A heat sensor 40 also connects to the programmed controller 38. A gas inlet 42 connects to a source of inert gas such as nitrogen 44 through a gas control valve 46 which connects to the programmed controller 38. The ferrite material 48 to be calcined is placed into a suitable crucible container 50. The programmed controller 38 is programmed to achieve the desired temperature and atmosphere over time within the oven 32.

The calcined ferrite is then cooled while being continuously swept with a flowing inert gas such as nitrogen to prevent any reoxidation of the ferrous iron. The cool down temperature of the calcine mixture should be at least 150 degrees centigrade or less over a period of time prior to exposure to any different type of atmosphere.

Prior to the second milling step, there can be a pulverized step of the ferrite material to a size of about 0.1 the diameter of the milling media. A second milling then pulverizes the ferrite material to a final particle size in a stainless steel ball media sufficient to achieve a predetermined particle size and ferrous content. The ferrous iron content generated during the second milling step is additional dependent upon the level of ferrous iron generated during the previous calcine step. The higher the level of the ferrous iron out of the calcine generation, the larger additional ferrous iron is generated during the second mill step. The wet ball milling occurs over a period of one to four hours.

The second and final milling step can be a wet ball milling of the pulverized ferrite material for achieving the desired end particle size and ferrous content. Again, stainless steel balls in a stainless steel container are utilized. This milling step further contributes to the overall ferrous iron content from a reaction between the steel media and calcined ferrite powder. The amount of additional ferrous iron enhancement is dependent on the ferrous iron level from the previous calcine step. The greater the level from the calcine step, the more ferrous iron enhancement that occurs. This provides that the properties of the ferrite material are optimized for hot pressing or sintering.

FIG. 3 illustrates a flow chart of the process steps and the action taken for each step. The figure illustrates the flow of the process steps including the weighting of the powder where the ferrous iron content is set prior to any other steps followed by the important first milling step, where slight iron pick-up occurs. Calcining follows with ferrite reaction and ferrous iron generation. A second milling step for particle reduction and additional ferrous iron pick-up. Finally, forming and compaction to a desired shape followed by densification by application of heat forming the high density ferrite product. The end result is product of a predetermined fixed composition. By chemically analyzing the chrome content of the compound after each milling step, the iron content picked up from the media can be determined and confirmed.

EXAMPLE

Using MnZn ferrite having a composition of 53 mole percent of $Fe_2O_3$, 32 mole percent of MnO and 15 mole percent ZnO, the $Fe_2O_3$, $MnCO_3$, and ZnO are wet ball milled in a 2.5 gallon stainless steel ball mill with stainless steel media in water for two hours. This mixture is dried at 125 degrees centigrade and pulverized to obtain a fine powder. Under a flowing nitrogen atmosphere, the ferrite is calcined at 1070 degrees centigrade for five hours. Following the calcine operation, the ferrite material is pulverized and ball milled in a 1.5 gallon stainless steel mill and stainless steel media in water for two hours. This provides a ferrite having ferrous iron content of about 1.7 percent. This is a representative example of the principles and teachings of the disclosure of the present invention.

We claim:

1. Process of preparing a ferrite composition with a final ferrous iron content of about 1.5% from ferrite material in a mixture with ranges of 52–55 mole percent $Fe_2O_3$, 26–32 mole percent MnO and 15–20 (22) mole percent ZnO, the process comprising the steps of:
   a. weighing powders for setting a desired final ferrite powder composition;
   b. first milling said ferrite powder composition in a stainless steel mill with stainless steel media for intimate mixing of said ferrite powder composition and controlled iron pick-up;
   c. calcining said ferrite powder composition for a first time interval under a flowing inert atmosphere providing for formation of ferrite spinal structures in a ferrite reaction of ferric iron to ferrous iron reduction; and,
   d. second ball milling said calcined ferrite powder composition in a stainless steel mill with stainless steel media for a second time interval providing particle reduction and additional ferrous iron pick-up yielding an optimum final ferrous iron content of about 1.5% in said final ferrite powder composition.

2. Process of claim 1 wherein said inert atmosphere is nitrogen.

3. Process of claim 1 wherein the temperature of said calcining step is in a range of 900 degrees to 1100 degrees centigrade.

4. Process of claim 3 wherein said temperature is lower for larger pick-ups of ferrous iron during said first milling.

5. Process of claim 1 wherein said first time interval is one to ten hours.

6. The process of claim 1 wherein said second time interval is one to four hours.

7. Process of claim 1 comprising the step of cooling said calcined mixture in an inert flowing atmosphere.

8. Process of claim 6 wherein said mixture is cooled to a temperature of 150° C. or less.

9. Process of claim 7 wherein said atmosphere is nitrogen.

10. In process of preparing a desired final ferrite composition with a desired final ferrous iron content from ferrite material of a powder mixture in ranges of 52–55 mole percent Fe$_2$O$_3$, 26–32 mole percent MnO and 15–20 (22) mole percent ZnO including weighing said powders for setting said desired final ferrite composition, an improvement comprising:

a. incorporating controlled iron pick-up during a first milling of said ferrite composition in a stainless steel mill with stainless steel media during intimate mixing of said ferrite powder composition;

b. said controlled iron pick-up acting as a catalyst for ferric iron to ferrous iron reduction during calcining of said ferrite composition for a first time interval under a flowing inert atmosphere providing for formation of ferrite spinal structures in a ferrite reaction; and, c. providing particle reduction and additional ferrous iron pick-up during a second milling operation yielding an optimum final ferrous iron content of about 1.5% in said final ferrite composition during said second ball milling said calcined ferrite composition in a stainless steel mill with stainless steel media for a second time interval.

* * * * *